Patented Oct. 12, 1937

2,095,484

UNITED STATES PATENT OFFICE 2,095,484

AZODYESTUFFS

Carl Taube, Leverkusen-I. G. Werk, and Johann Heinrich Helberger, Cologne-Mulheim, Germany, assignors to General Aniline Works, Inc., New York, N. Y., a corporation of Delaware No Drawing. Application October 15, 1935, Serial No. 45,162. In Germany October 17, 1934

3 Claims. (Cl. 260—12)

The present invention relates to new heavy metal complex compounds of azodyestuffs, more particularly it relates to heavy metal complex compounds of azodyestuffs which are derived from heterocyclic amines as diazotization components, containing in the heterocyclic nucleus the grouping

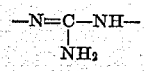

Our new dyestuffs are obtainable by starting with such azodyestuffs as are derived from heterocyclic amines as diazotization components containing in the heterocyclic nucleus the grouping

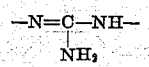

and transforming the same according to methods known per se in substance or on a substratum, especially on the fiber, into their heavy metal complex compounds, for example by treating with the heavy metal in a finely divided form or with a suitable heavy metal compound.

As amines containing the grouping

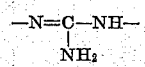

there may be mentioned by way of example aminotetrazole (compare German Patent No. 426,243), aminotriazole (compare Annalen der Chemie, vol. 303, (1898), pages 33–56), guanazole (compare Journal für praktische Chemie, vol. 88, (1913), page 310) and phenylguanazole (compare Gazetta Chimica Italiana, vol. 21, II, (1891), page 146, and vol. 31, I, (1901), page 482).

It is surprising that the coupling products of these diazotized amines with coupling components, such as phenols, aromatic amines, aminonaphtholsulfonic acids, pyrazolones, aceto-acetic acid arylamides, hydroxyquinolines and the like, are capable of forming valuable heavy metal complex compounds with heavy metal compounds, such as those of copper, nickel, iron, chromium, cobalt and the like.

In the azodyestuffs used as starting compounds the hydrogen atom of the imino group in the vicinal position to the amino group or azo-bridge respectively exerts so strong acidic properties as to have the solubilizing effect of a carboxylic acid group or a sulfonic acid group. Due to this acid property it is possible to prepare, for example with the aid of diazotized aminotetrazole and a coupling component without solubilizing groups, soluble azodyestuffs which can be applied to fibres and by aftertreating on the fibre with suitable metal compounds transformed into insoluble azodyestuffs by conversion into the heavy metal complex compounds.

The new azodyestuffs containing heavy metal in general exhibit valuable fastness properties and can be used for producing novel effects.

Among the great number of heavy metal complex compounds of azodyestuffs there are of especial technical value the copper complex compounds of the azodyestuffs of the general formula:

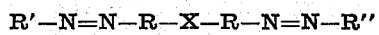

In this formula X represents a carbon-carbon linkage or a bridge especially such one as contains a hetero atom, for example oxygen, sulfur, the group NH and the group NH—CO—NH, R stands for a radical of the benzene series, bearing the azo group in p-position to X, R′ stands for the radical of an azodyestuff component with two coupling positions, bearing attached to the other coupling position the radical of a diazotized heterocyclic amine containing in the heterocyclic nucleus the grouping

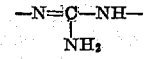

and R″ stands for R′ or for another azodyestuff coupling component.

The invention is illustrated by the following examples; but is not restricted thereto:

Example 1

10.3 parts by weight of aminotetrazole monohydrate are dissolved in 400 parts by weight of water and 100 parts by weight of 3-N-hydrochloric acid and are diazotized with 6.9 parts by weight of sodium nitrite, with cooling. The clear and colorless diazo solution is coupled in an acid medium with 1-(2′-chlorophenyl)-3-methyl-5-pyrazolone, and the dyestuff obtained is isolated in the usual manner and dried. It dyes wool from an acid bath clear yellow shades of excellent fastness to light, the fastness properties being improved by an after-treatment with chromium salts.

The heavy metal complex compound corresponds to the following formula:

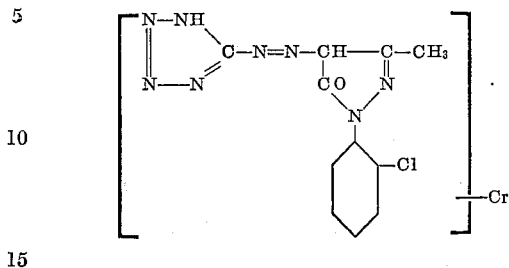

Similar dyestuffs are obtained by substituting the 1-(2'-chlorophenyl)-3-methyl-5-pyrazolone by the unsubstituted phenylmethylpyrazolone or by 1-(2', 5'-dichlorophenyl)-3-methyl-5-pyrazolone or 1-(2'-sulfophenyl)-3-methyl-5-pyrazolone, or 1-(2'-sulfo-5'-chloro)-3-methyl-5-pyrazolone.

Example 2

17.5 parts by weight of phenylguanazole are dissolved in 100 parts by weight of sulfuric acid of 60° Bé. and diazotized with 6.9 parts by weight of sodium nitrite, while cooling and stirring. The clear, yellowish colored diazo solution is dropped into an aqueous solution of the calculated quantity of the 3-methyl-5-pyrazolone of 2-chloraniline-5-sulfonic acid, while cooling and stirring. The dyestuff is isolated in the usual manner and dried. It dyes wool from an acid bath clear yellow shades of excellent fastness to light, the fastness properties being improved by an after-treatment with chromium salts.

The heavy metal complex compound corresponds to the following formula:

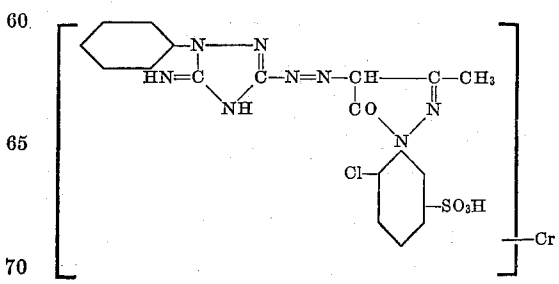

By substituting the 1-(2'-chloro-5'-sulfophenyl)-3-methyl-5-pyrazolone by other 1-(sulfophenyl)-3-methyl-5-pyrazolones there are obtained dyestuffs exhibiting similar properties.

Example 3

17.5 parts by weight of phenylguanazole are diazotized as described in Example 2 and coupled in strong hydrochloric acid solution with the calculated quantity of 2-amino-8-naphthol-6-sulfonic acid, with cooling and stirring. The dyestuff isolated in the usual manner dyes wool from an acid bath clear yellowish-red shades which by after-treatment with chromium salts turn to a deep reddish-brown.

The heavy metal complex compound corresponds to the following formula:

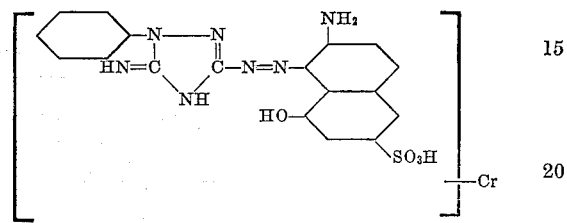

Example 4

17.5 parts by weight of phenylguanazole are diazotized as described in Example 2 and coupled in a strong hydrochloric acid solution with the calculated quantity of 2-amino-5-naphthol-7-sulfonic acid, with cooling and stirring. The dyestuff is isolated and coupled in solution alkaline with sodium carbonate in the presence of pyridine with the calculated quantity of tetrazotized benzidine o-o'-dicarboxylic acid. The dyestuff isolated in the usual manner dyes cotton from a Glauber's salt bath violet shades which on after-treating with copper salts are turned to a navy blue fast to washing.

The heavy metal complex compound corresponds to the following formula:

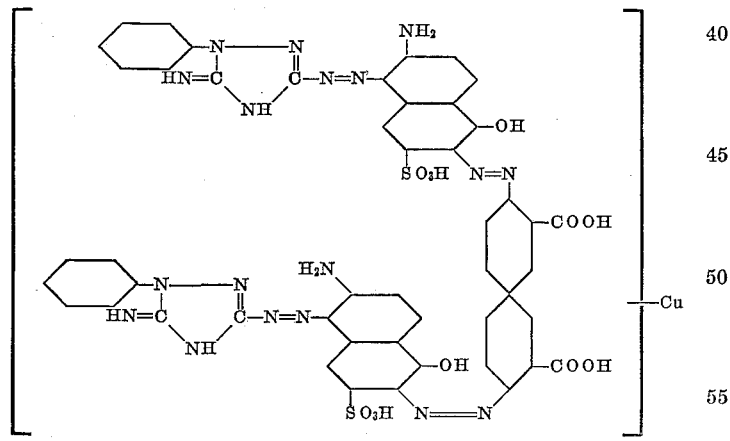

Example 5

10.3 parts by weight of aminotetrazolemonohydrate are diazotized as described in Example 1 and coupled in weakly alkaline solution with 2,3-hydroxynaphthoic acid-β-naphthylamide. The isolated monoazodyestuff dyes cotton from a Glauber's salt bath orange shades which by after-treating with nickel salts are turned to red and become fast to washing and light.

The heavy metal complex compound corresponds to the following formula:

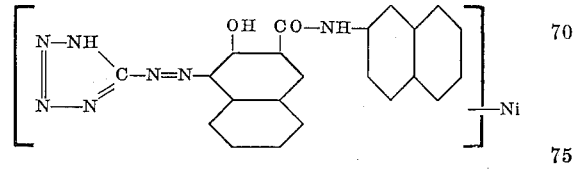

Example 6

10.3 parts by weight of aminotetrazolemonohydrate are diazotized as described in Example 1 and coupled with 14.4 parts by weight of β-naphthol. The dyestuff isolated in the usual manner dyes wool reddish-yellow shades which on aftertreatment with chromium salts are turned to Bordeaux.

The heavy metal complex compound corresponds to the following formula:

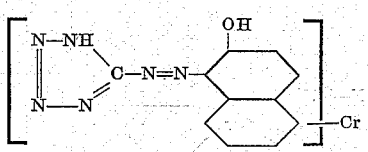

Example 7

3.2 parts by weight of resorcinol are dissolved in 100 parts by weight of water, and the solution is weakly acidified with hydrochloric acid. To the solution there is added a diazo solution prepared from 3 parts by weight of aminotetrazole containing water of crystallization, 2 parts by weight of sodium nitrite, 100 parts by weight of water and 5 parts by weight of concentrated hydrochloric acid. Coupling commences immediately, and the dyestuff has soon completely separated in the form of a yellow crystal powder. When the coupling is complete, the dyestuff is brought into solution by the addition of 15-20 parts by weight of sodium carbonate, and the coupling product is coupled with a tetrazo solution obtained by tetrazotizing 1.34 parts by weight of benzidine. The coupling is accelerated by the addition of pyridine. The dyestuff is isolated by salting out and pressing; it dyes cotton reddish-brown shades which by after-coppering become fast to light and washing.

The heavy metal complex compound corresponds to the following formula:

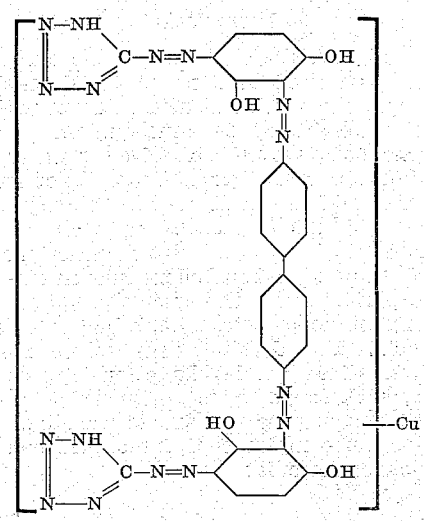

Dyestuffs exhibiting similar properties are obtained by substituting the benzidine by its substitution products, such as dianisidine, by 4.4'-diaminodiphenylurea or derivatives thereof or by diaminodiphenylamine or other diazo components of the benzene series containing two diazotizable amino groups.

Example 8

9 parts by weight of 2-amino-5-naphthol-7-sodium sulfonate are dissolved in 120 parts by weight of water, and the solution is acidified with hydrochloric acid until acid to Congo red. To the acid suspension of the aminonaphthol sulfonic acid there is added in one portion a diazo solution prepared from 3 parts by weight of aminotetrazole containing water of crystallization and 2 parts by weight of sodium nitrite in 100 parts by weight of water and 5 parts by weight of concentrated hydrochloric acid. Coupling commences immediately, and after some time there is obtained a clear orange yellow solution. The dyestuff soon begins to crystallize, and by the addition of common salt its separation is completed. It is isolated in the usual manner and again dissolved in 100 parts by weight of water with 10 to 15 parts by weight of sodium carbonate. To the solution there is added the tetrazo solution prepared in the usual manner from 3.6 parts by weight of dianisidine and 2 parts by weight of sodium nitrite. The coupling is accelerated by the addition of pyridine. The dyestuff is isolated by salting out and pressing; it dyes cotton greenish-dark blue shades, which by after-coppering become fast to light and washing.

The heavy metal complex compound corresponds to the following formula:

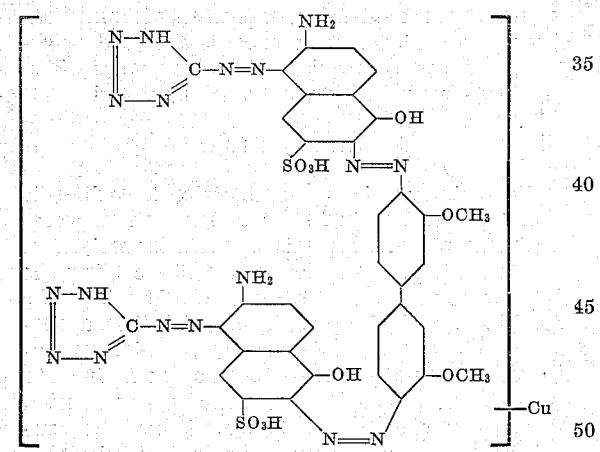

Dyestuffs exhibiting similar properties are obtained by substituting the dianisidine by benzidine, benzidine-o.o'-dicarboxylic acid or derivatives of benzidine other than dianisidine, or by 4.4'-diaminodiphenylamine or other derivatives of the benzene or naphthalene series containing two diazotizable amino groups.

Example 9

The dyestuff described in Example 7 prepared by coupling in acid solution one molecular proportion of aminotetrazole and one molecular proportion of 2-amino-5-naphthol-7-sulfonic acid is coupled in solution, alkaline with sodium carbonate, with the coupling product from one molecular porportion of tetrazotized benzidine and one molecular proportion of salicylic acid, if desired with the addition of pyridine. The dyestuff thus obtained dyes cotton blackish-brown shades which by after-treating with copper sulfate solution become fast to light and washing.

The heavy metal complex compound corresponds to the following formula:

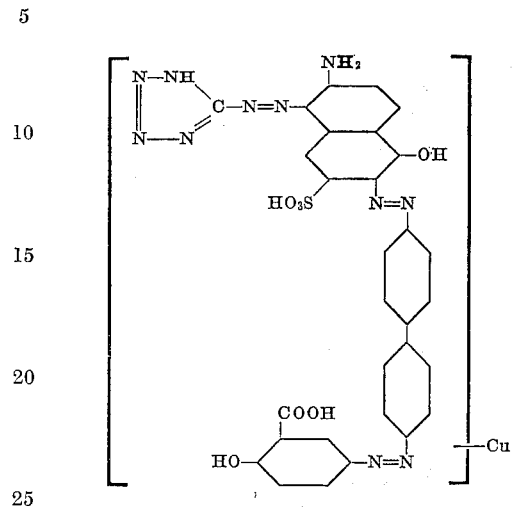

By combining the dyestuff from one molecular proportion of diazotized aminotetrazole and one molecular proportion of resorcinol with the diazoazo compound from one molecular proportion of tetrazotized benzidine and one molecular proportion of salicyclic acid there is obtained a dyestuff dyeing cotton yellowish-brown shades which by after-coppering become fast to light and washing.

*Example 10*

3.8 parts by weight of aminotriazole carboxylic acid are dissolved in 100 parts by weight of water with the aid of ammonia, 2 parts by weight of sodium nitrite are added, and while cooling the solution is acidified with hydrochloric acid. The diazo solution obtained is brought into a suspension of an equivalent quantity of 2-amino-5-hydroxynaphthalene-7-sulfonic acid in 800 parts by weight of ice water, the said suspension weakly reacting acid to Congo. When the coupling is complete, the monoazodyestuff is isolated in the usual manner and dissolved with the aid of 15 parts by weight of soda in a mixture of 100 parts by weight of pyridine and 100 parts by weight of water. Into this solution there is slowly dropped in at 30–40° C. the diazo solution prepared in the usual manner from the equivalent quantity of dianisidine, then the temperature is elevated to 60° C. and kept at this temperature for several hours while stirring. The tetrakisazodyestuff formed is salted out, filtered and dried.

The dyestuff dyes cotton from a Glauber's salt bath navy blue shades, which by after-treatment with copper salts become fast to light and washing. In its free state the copper complex compound corresponds to the following formula:

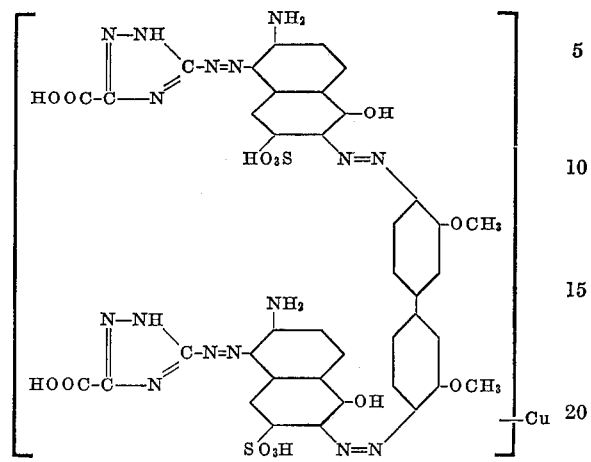

*Example 11*

4 parts by weight of aminotriazole carboxylic acid are dissolved in 250 parts by weight of water with the aid of soda, 2 parts by weight of sodium nitrite are added and after cooling the solution is acidified with aqueous diluted nitric acid. The diazo solution is allowed to stand for 30 minutes, then poured into a solution of 4 parts by weight of salicylic acid in 300 parts by weight of water, the said solution containing soda in such a quantity that the coupling mixture is reacting alkaline to soda. The yellow monazodyestuff yields when dyed on wool and after-treated with a chromium salt yellowish brown shades.

The chromium complex compound corresponds to the following formula:

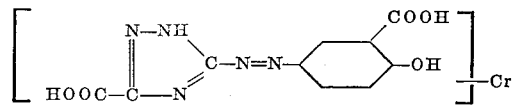

*Example 12*

4 parts by weight of aminotriazole carboxylic acid are diazotized as described in Example 11 and coupled in a mineral acid solution with 4.6 parts by weight of 8-amino-quinaldine. The yellow monoazodyestuff is dissolved in water with the aid of ammonia, 2 parts by weight of sodium nitrite are added and after this the solution is acidified with dilute aqueous hydrochloric acid. The diazo compound isolated in the usual manner is coupled in a soda-alkaline medium in the presence of pyridine with the calculated quantity of 2 - phenylamino-5-hydroxynaphthalene - 7 - sulfonic acid. The dyestuff dyes cotton from a Glauber's salt bath violet shades, which on after-treating with copper salts are turned to a clear greenish blue of good fastness to washing.

The copper complex compound corresponds to the following formula:

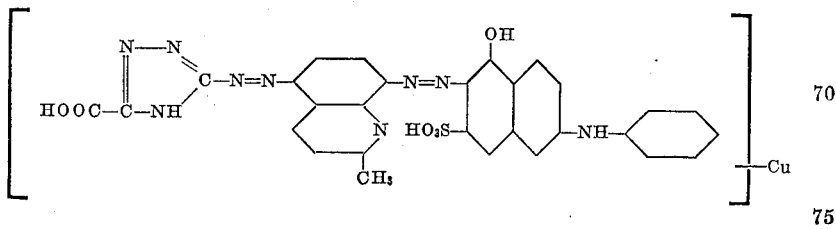

In the following table there are given some further combinations and the shade of the copper compound on cotton:

| | Dyestuff | Shade of the copper complex compound on cotton |
|---|---|---|
| (1) | I-acid ← dianisidine → I-acid<br>↑ ↑<br>aminotriazole aminotriazole | Deep navy blue |
| (2) | I-acid ← dianisidine → I-acid<br>↑ ↑<br>aminomethyltriazole aminomethyltriazole | Navy blue. |
| (3) | m-phenylendiamine ← benzidine-o, o'- → m-phenyl-<br>dicarboxylic acid endiamine<br>↑ ↑<br>aminotriazole aminotriazole | Brown. |
| (4) | resorcinol ← benzidine-o, o'- → resorcinal<br>dicarboxylic acid<br>↑ ↑<br>aminotriazole aminotriazole | Brown. |
| (5) | 2, 4-toluylen- ← benzidine-o, o'- → 2, 4-toluylen-<br>diamine dicarboxylic acid diamine<br>↑ ↑<br>aminotriazole aminotriazole | Brown. |
| (6) | 1-methyl-3- ← benzidine-o, o'- → I-acid<br>phenyl-5-pyrazolone dicarboxylic acid ↑<br>aminotriazole<br>carboxylic acid | Blackish brown. |
| (7) | aminotetrazole → diacetoacetic- ← aminotetrazole<br>o-tolidine | Yellow. |
| (8) | m-phenylendiamine ← dianisidine → m-phenylen-<br>↑ diamine<br>aminotetrazole ↑<br>aminotetrazole | Blackish brown. |

The heavy metal complex compounds when prepared in substance generally are water-insoluble substances suitable as pigments.

We claim:

1. Heavy metal complex compounds of azodyestuffs which are derived from heterocyclic amines as diazotization components containing in a five-membered carbon and nitrogen containing heterocyclic nucleus the grouping

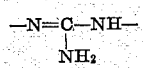

in which group the amino group is capable of undergoing diazotization, yielding when prepared on the fiber generally various shades of good fastness properties.

2. Heavy metal complex compounds of azodyestuffs of the general formula:

$$R'—N=N—R—X—R—N=N—R'',$$

wherein X represents a member selected from the group consisting of a carbon-carbon linkage, an oxygen atom, a sulfur atom, an imino group and the group —NH—CO—NH—, R stands for a radical of the benzene series, bearing the azo group in para-position to X, R' stands for the radical of an azodyestuff component with two coupling positions, bearing attached to the other coupling position the radical of a diazotized heterocyclic amine containing in a five-membered carbon and nitrogen containing heterocyclic nucleus the grouping

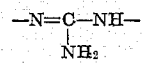

in which group the amino group is capable of undergoing diazotization, and R'' stands for a member selected from the group consisting of R' and another azodyestuff coupling component.

3. Copper complex compounds of the azodyestuff of the general formula:

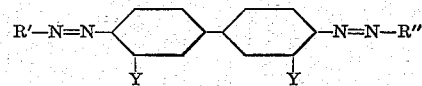

wherein R' stands for the radical of an azodyestuff component with two coupling positions, bearing attached to the other coupling position the radical of a diazotized heterocyclic amine containing in a five-membered carbon and nitrogen containing heterocyclic nucleus the grouping

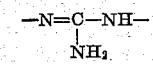

in which group the amino group is capable of undergoing diazotization, and R'' stands for a member selected from the group consisting of R' and another azodyestuff coupling component, Y stands for a member selected from the group consisting of hydrogen, the carboxylic acid group and an alkoxy group.

CARL TAUBE.
JOHANN HEINRICH HELBERGER.